UNITED STATES PATENT OFFICE.

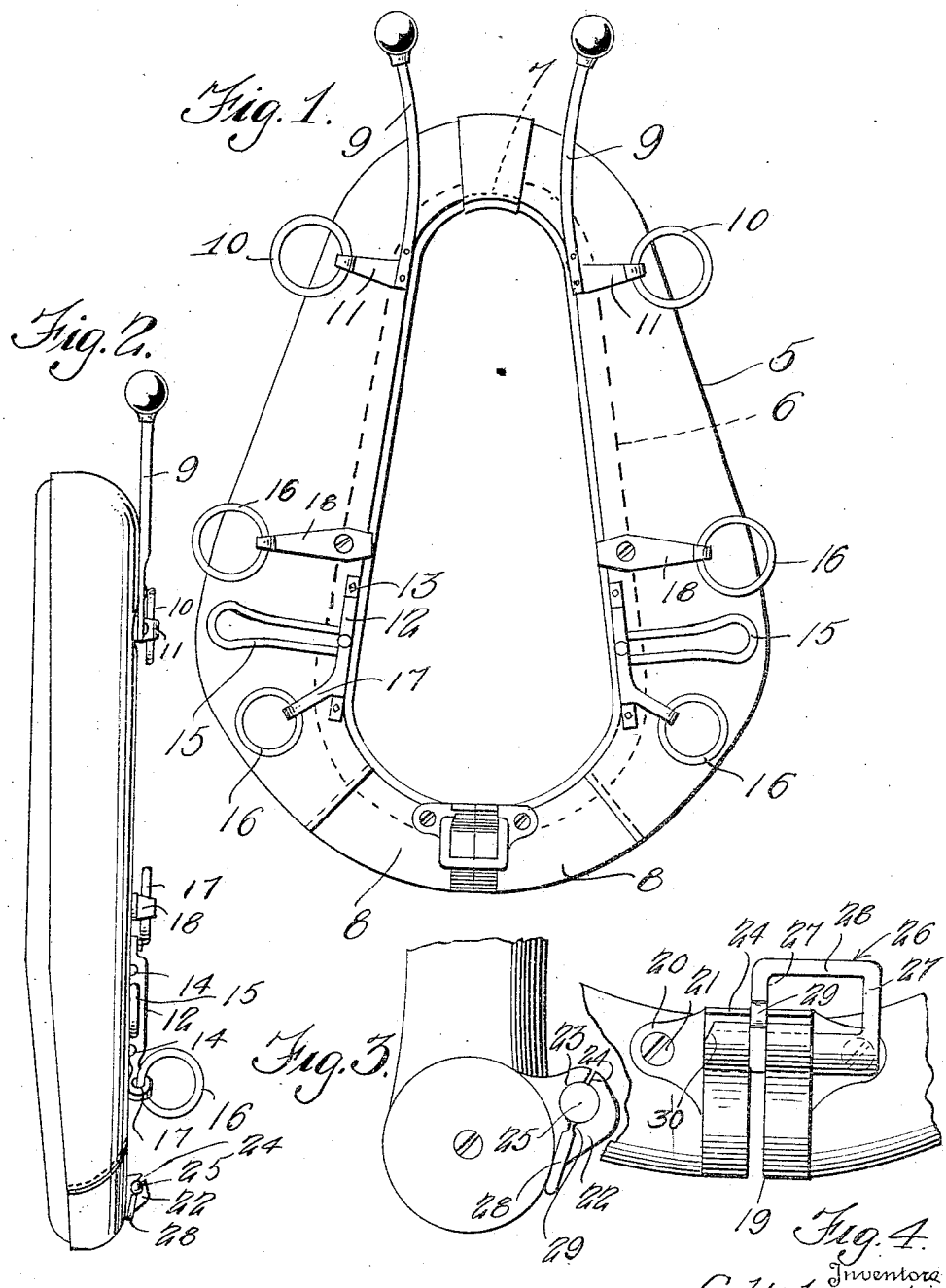

CZESLAW URBANSKI, WILLIAM J. SMITH, AND DAVID F. SMITH, OF BUFFALO, NEW YORK.

HORSE-COLLAR.

1,294,352.   Specification of Letters Patent.   Patented Feb. 11, 1919.

Application filed June 13, 1917. Serial No. 174,612.

*To all whom it may concern:*

Be it known that we, CZESLAW URBANSKI, WILLIAM J. SMITH, and DAVID F. SMITH, citizens of the United States, residing at Buffalo, in the county of Erie and State of New York, have invented certain new and useful Improvements in Horse-Collars; and we do hereby declare the following to be a full, clear, and exact description of the invention, such as will enable others skilled in the art to which it appertains to make and use the same.

This invention relates to improvements in horse collars of the open bottom type, and has for its primary object to provide a simple and effective fastener for the abutting ends of the collar which also constitutes a securing loop for the back and choke strap of the harness.

With this and other objects in view, the invention consists in the novel construction, combination and arrangement of parts as will be hereinafter specifically described, claimed and illustrated in the accompanying drawing, in which:

Figure 1 represents a front elevation of the improved horse collar,

Fig. 2 represents a side elevation thereof,

Fig. 3 represents an end elevation of one end of the collar, showing the fastening element detached from the other end of the collar, and Fig. 4 represents a fragmentary front elevation of the horse collar, illustrating the fastening element in released position.

Referring to the drawing in detail, wherein similar reference numerals designate corresponding parts throughout the several views, the numeral 5 indicates generally a horse collar which is preferably constructed in accordance with the improved construction shown and described in our co-pending application Serial No. 174,611 for improvements in horse collars. In the improved construction the internal reinforcing elements 6 are arranged internally of the covering of the collar and are pivotally connected at their upper ends by hinge joints 7, said construction permitting the lower open ends 8 of the collar to be swung apart for convenience in applying and removing the collar.

Hame posts 9 are secured to the reinforcing members 6 externally of the collar covering and line rings 10 are secured to the reinforcing members 6 by supporting arms 11.

Supporting bars or straps 12 are bolted, or otherwise secured, as indicated at 13, to the reinforcing members 6 of the collar and each bar is provided in its rear surface with recesses 14, receiving the recessed terminals of U-shaped staples 15, which latter are designed to support parts of the harness of a draft animal. Each bar 12 is preferably provided with four or more recesses 14 to permit of a relatively wide range of vertical adjustment of the staples 15, and breast strap rings 16 are secured to the collar by supporting arms or clips 17 secured underneath the bars 12. Extra back strap rings are preferably secured to the front of the collar by supporting plates 18, which are secured to the reinforcing members 6.

Substantially cup-shaped end plates 19 are secured to the lower ends of the open bottom collar 5 and are provided with oppositely directed and apertured ears 20, overlying the reinforcing members 6 and receiving screws, or equivalent fastening means 21, which are threaded into the bars or reinforcing members 6 and assist in securing the end plates in position thereon. The plates 19 are provided with forwardly and upwardly directed ears 22, having apertures 23 formed therein which communicate with vertically disposed entrance throats 24. The body member 25 of the locking element, designated generally by the numeral 26, is rotatably mounted in the ears 22.

The locking element 26 is a closed loop of substantially rectangular formation, and includes, in addition to the cylindrical body member 25, the end members 27 and connecting bar 28, which constitute a handle and strap support. The throat 24 in one of the ears 22 is of less width than the end members 27 to prevent the locking element from being removed from that ear, but the throat of the other ear is of such width as to permit the reduced portion 29 of one of the end members to be slipped longitudinally through the throat so as to position the body member 25 in the openings 23 of the two ears when the terminals 8 of the collar are moved together. After the body member has been properly positioned in the ear having the relatively wide throat 24, it is swung downwardly to the position shown in Figs. 1, 2 and 3, so as to move the end members 27 out of line with the throats 24 and thus firmly secure the adjacent ends of the collar together. The side face of the ear 22 having the relatively wide throat therein is beveled or inclined, as indicated at 30, so as to cause the adjacent end member of the locking element in moving thereover to draw the adjacent ends of the collar together.

When swung to locked position, the fastening element or loop 26 is held in position by gravity, and owing to its peculiar rectangular formation it may be utilized for securing or supporting the back and choke strap loop.

It is preferable to provide each of the openings 23 with the outwardly extending slots or throats 24 as an easy means of introducing the loop or eye 26 into the ears 22 and of removing it therefrom by spreading the walls of the narrow slots 24.

What we claim is:

1. A horse collar having abutting lower ends, locking plates secured to said ends, ears carried by the plates adjacent the meeting ends of said collar, said ears being provided with openings which aline when the ends of the collar are in closed position, one of said ears having a throat passageway communicating with the opening therethrough, and means attached to the other ear passing through said throat passageway and ear opening and engaging the ear to maintain the abutting ends of the collar in a locked position.

2. A horse collar having abutting lower ends, locking plates secured to the abutting ends, slotted ears on said plates, an outwardly unsupported loop detachably connected with said slotted ears and adapted to embrace said ears to hold said abutting ends substantially against movement away from each other, and means operable in one position of the loop for engagement with one of said ear slots.

3. A horse collar having abutting ends, end plates secured to the abutting ends, apertured ears carried by the plates, the ears having outwardly directed throats or slots communicating with the openings therein, and an outwardly unsupported fastening loop adapted to embrace said apertured ears and one of the sides of which is positioned in the alining openings and adapted to be held therein in locked position by gravity, and movable through any of the throats so as to release the end plates.

4. A horse collar having abutting lower ends, end plates secured to the abutting ends, apertured ears carried by the end plates, one of said ears having a throat communicating with the opening therethrough, a substantially rectangular fastening loop positioned in the openings in the ears, and said loop member being recessed where it engages said throat passageway to permit its easy movement therethrough.

5. A horse collar made in sections and having horizontally abutting ends, apertured ears on the horse collar near said ends, said ears being provided with upwardly and outwardly extending throats communicating with the openings therethrough, a fastening loop positioned in the openings in the ears, said loop member being provided with a recess adapted for engagement with one of the throats, so as to permit the removal of the loop member.

6. An open ended horse collar having abutting ends, end plates secured to the abutting ends, a fastening loop for securing said ends together, part of the walls of said loop being of reduced thickness, and apertured eyes at said abutting ends in which the loop is directly engageable by gravity, said apertures having upwardly and outwardly directed throats of reduced width adapted for engagement with said reduced loop part.

7. A horse collar having abutting lower ends, plates secured to said ends, apertured ears carried by said plates adjacent their abutting ends, one of said ears having a passage way communicating with the opening therein, the end wall of said passage way being beveled, and means movable in said passageway, and engaging the beveled end wall to draw and maintain the end plates in closed position.

In testimony whereof we affix our signatures in presence of two witnesses.

CZESLAW URBANSKI.
WILLIAM J. SMITH.
DAVID F. SMITH.

Witnesses:
MORRIS G. PERLSTEIN,
HARRIS G. RICHARDSON.

Copies of this patent may be obtained for five cents each, by addressing the "Commissioner of Patents, Washington, D. C."